United States Patent
Ro et al.

(10) Patent No.: US 6,867,853 B2
(45) Date of Patent: Mar. 15, 2005

(54) RESIDUAL STRESS MEASURING SYSTEM FOR OPTICAL FIBERS

(75) Inventors: Sung-In Ro, Kumi (KR); Hyeon-cheol Kim, Kumi (KR); Yong-Woo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/658,645

(22) Filed: Sep. 9, 2003

(65) Prior Publication Data

US 2004/0075826 A1 Apr. 22, 2004

(30) Foreign Application Priority Data

Oct. 18, 2002 (KR) .............................. 10-2002-0063864

(51) Int. Cl.⁷ .............................................. G01N 21/00
(52) U.S. Cl. ..................................................... 356/73.1
(58) Field of Search ............................... 356/73.1, 364; 385/11–15, 31, 33, 39, 123

(56) References Cited

U.S. PATENT DOCUMENTS

| | | | | |
|---|---|---|---|---|
| 4,882,497 A | * | 11/1989 | Inoue et al. ........... | 250/559.08 |
| 5,108,173 A | * | 4/1992 | Achurch et al. .......... | 356/73.1 |
| 6,373,564 B1 | * | 4/2002 | Park et al. ................. | 356/73.1 |
| 2001/0022873 A1 | | 9/2001 | Kim et al. .................... | 385/13 |

OTHER PUBLICATIONS

"Photoelastic Computer Tomography: A Novel Measurement Method for Axial Residual Stress Profile in Optical Fibers;" Tetsuji Abe et al.; Optical Society of America; vol. 3, No. 1, Jan. 1986; 6 pages.

* cited by examiner

Primary Examiner—Tu T. Nguyen
(74) Attorney, Agent, or Firm—Cha & Reiter, L.L.C.

(57) ABSTRACT

Disclosed is a residual stress measuring system for measuring the residual stress in an optical fiber. The residual stress measuring system comprises a light source for generating light used to measure the residual stress, a lens system for converting the generated light into a plane wave, a polarimeter for transforming the converted light to an input polarized light, which is incident on the optical fiber, a rotational measuring section for rotating the optical fiber so as to enable the polarized light to transmit through the optical fiber in various directions, and a detector for detecting the residual stress from a phase shift of the transmitted light.

7 Claims, 5 Drawing Sheets

RESIDUAL STRESS MEASURING SYSTEM FOR OPTICAL FIBERS

CLAIM OF PRIORITY

This application claims priority to an application entitled "APPARATUS FOR RESIDUAL STRESS MEASURING OF OPTICAL FIBER," filed in the Korean Intellectual Property Office on Oct. 18, 2002 and assigned Serial No. 2002-63864, the contents of which are hereby incorporated by reference.

BACKGROUND OF THE INVENTION

1. Field of the Invention

The present invention relates to a system for measuring the residual stress of optical fibers, and more particularly to a system for measuring the residual stress remained in an optical fiber and has an asymmetrical circular stress distribution.

2. Description of the Related Art

In general, a residual stress created during the manufacturing stage of drawing an optical fiber remains within the optical fiber. This residual stress causes undesirable changes in the refractive index of the fiber and, as a result, increases the light loss in the optical fiber caused by a photoelastic effect. As such, the residual stress and its distribution in the optical fiber must be measured accurately and then adjusted accordingly.

The residual stress in the optical fiber is typically measured using a photoelastic effect, which is a phenomenon in which a refractive index of the fiber is changed along a direction of the stress remaining in a transparent solid medium, such as an optical fiber. Thus, the refractive index of an optical fiber or an optical fiber pre-form changes along the polarized direction, and this change can be observed to measure the stress remained in the fiber.

FIG. 1 is a schematic view of a conventional system used for measuring the residual stress of optical fibers, and FIG. 2 is a diagram showing a phase shift along a light path.

As shown in FIG. 1, the conventional residual stress measuring system includes a light source 10 such as a laser, a lens system 30 for aligning the generated light, a polarimeter 50 for polarizing the aligned light, a residual stress measuring section 60, and a light detector 70 for measuring a phase shift of the light generated from a photoelastic effect, which is caused by the residual stress remained in the fiber.

In operation, light cast from the light source 10, such as a Helium-Neon laser, is reflected by a mirror 20 and passes through the lens system 30, which includes a beam diffuser 31, a lens 32, and a iris 33, and then is converted into a plane wave. The plane wave is reflected again by another mirror 40 and enters into the polarimeter 50, which includes a polarizer 51, a wavelength plate 52, and a condenser 53. The functions of the mirrors 20 and 40 are to provide a compact design by changing the light path within a given space. The polarized light is incident into an optical fiber 62 positioned in the residual stress measuring section 60, which includes a slide glass 61 and a cover glass 63. The light passing through the optical fiber has a phase difference resulting from a stress distribution of interior of the optical fiber, and further passes through an objective lens 71 and a polarization analyzer 72. A sensor 73 transforms the intensity of light passing through the polarization analyzer 72 into an electrical signal, thereby measuring the residual stress of the optical fiber.

The residual stress of the optical fiber can be represented by a formula below.

$$I(y)=I_o \sin^2(\Phi(y)/2),$$

wherein $I_o$ represents the intensity of a background, and $\Phi(y)$ represents the phase shift induced by the residual stress.

As shown in FIG. 2, it will be seen that light incident on the fiber and in parallel with an x-axis may be divided into two components. A phase shift of the incident light can be represented as follows:

$$d\Phi(y) = \frac{2\pi}{\lambda} dx(n_y - n_z)$$

Therefore, the phase shift generated by the residual stress can be represented by a photoelastic effect, which is illustrated mathematically as follows:

$$n_y - n_z = C(\sigma_y - \sigma_z)$$

and $$d\Phi(y) = \frac{2\pi C}{\lambda} dx(\sigma_y - \sigma_z).$$

Further, total residual stress and the photoelastic effect have a profile that can be represented as follows:

$$\sigma_z(r) = \frac{-\lambda}{2\pi^2 C_o} \int_r^b \frac{d\Phi/dy}{\sqrt{y^2 - r^2}} dy$$

and $$C(r)E(r) = \frac{-\lambda}{2\pi^2} \int_r^b \frac{dW/dy}{\sqrt{y^2 - r^2}} dy,$$

wherein $C_o$ represents the photoelastic coefficient of the fused silica. Note that these formula are applied under conditions as follows:

1. An incident light must pass through the interior of the optical fiber on a straight direction without changing its path.
2. A Brewster coefficient must be constant in an incident direction, i.e., in a diametrical direction (a double refraction does not occur due to a constant composition characteristics of the materials, which allows a phase shift to be generated by the residual stress).
3. Residual stress induced by a radius or an angle may not be ignored over the axial stress ($\sigma_z \gg \sigma_\theta, \sigma_p$).

As illustrated above, it is possible to measure the residual stress of an optical fiber only in a single direction according to teachings in the art. Therefore, it is difficult to precisely measure the residual stress and its distribution in an optical fiber and, in particular in an optical fiber having an asymmetrical circular stress distribution or having regularly spaced air holes along the fiber cladding (known as a photonic crystal fiber).

SUMMARY OF THE INVENTION

Accordingly, the present invention has been made to solve the above-mentioned problems occurring in the prior art and provides additional advantages, by providing a residual stress measuring system for optical fibers that is capable of measuring residual stress having an asymmetrical circular stress distribution within the optical fiber.

One embodiment of the present invention relates to a residual stress measuring system for optical fibers. The system includes: a light source for generating light used to measure the residual stress; a lens system for converting the generated light into a plane wave; a polarimeter for transforming the converted light to an input polarized light and incident on the input polarized light into the optical fiber; a rotational measuring section for rotating the optical fiber so as to enable the polarized light to transmit through the optical fiber in various directions; and, a detector for detecting the residual stress from a phase shift of the transmitted light, wherein the rotational measuring section rotates the optical fiber, and for measuring residual stress having an asymmetrical circular stress distribution within the optical fiber.

According to one aspect of the invention, the rotational measuring section comprises an optical fiber holding section, which includes a slide glass and a cover glass for interposing the optical fiber between both glasses, and a first jig for holding one end of the optical fiber; and, a motor for rotating the first jig holding the optical fiber.

According to another aspect of the invention, the optical fiber holding section further comprises a second jig for holding the other end of the optical fiber; and a driving section for transmitting a rotating force from the motor to the first and second jigs uniformly so as to rotate the optical fiber in a controlled manner.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENT

First, the present invention is based on the technical principle as described below.

To measure the stress of an optical fiber having an asymmetrical stress distribution, the stress in various directions ranging from zero to 180 degrees is measured according to the teachings of the present invention. When the stress is measured at a certain angle $\alpha$, a difference between the phase shifts of the respective axes induced by the residual stress may be given as the following Equation 1.

$$\delta_\alpha(t)=2\pi/\lambda \int [n_z(t,s)-n_t(t,s)]ds, \quad \text{Equation 1}$$

wherein $\lambda$ represents the wavelength of the incident beam, and $n_z$ and $n_t$ represent the refractive indices relative to the reference axes of the optical fiber, and s represents the distance by which the beam travels. Equation 1 represents the difference in the phase shifts in two directions, an z-axis and a t-axis. The difference between the phase shifts provided from Equation 1 allows a two-dimensional axial residual stress distribution $\sigma_{zz}$ to be obtained through an inverse Radon transformation given by the following Equation 2.

$$\sigma_{zz}(x,y)=\lambda/2\pi C \cdot \text{iradon}\{\delta(t,\alpha)\}, \quad \text{Equation 2}$$

wherein $\sigma_{zz}(x,y)$ represents the residual stress of the z—z or longitudinal direction of the optical fiber, C represents the photoelastic constant, and iradon represents the function for the inverse Radon transformation. According to Equation 2, the stress along the longitudinal direction of the optical fiber can be figured out using a rotational measurement device.

Hereinafter, the preferred embodiments of the present invention will be described in detail with reference to FIGS. 3 to 6. For the purposes of clarity and simplicity, a detailed description of known functions and configurations incorporated herein will be omitted as it may make the subject matter of the present invention rather unclear.

Figure 1:
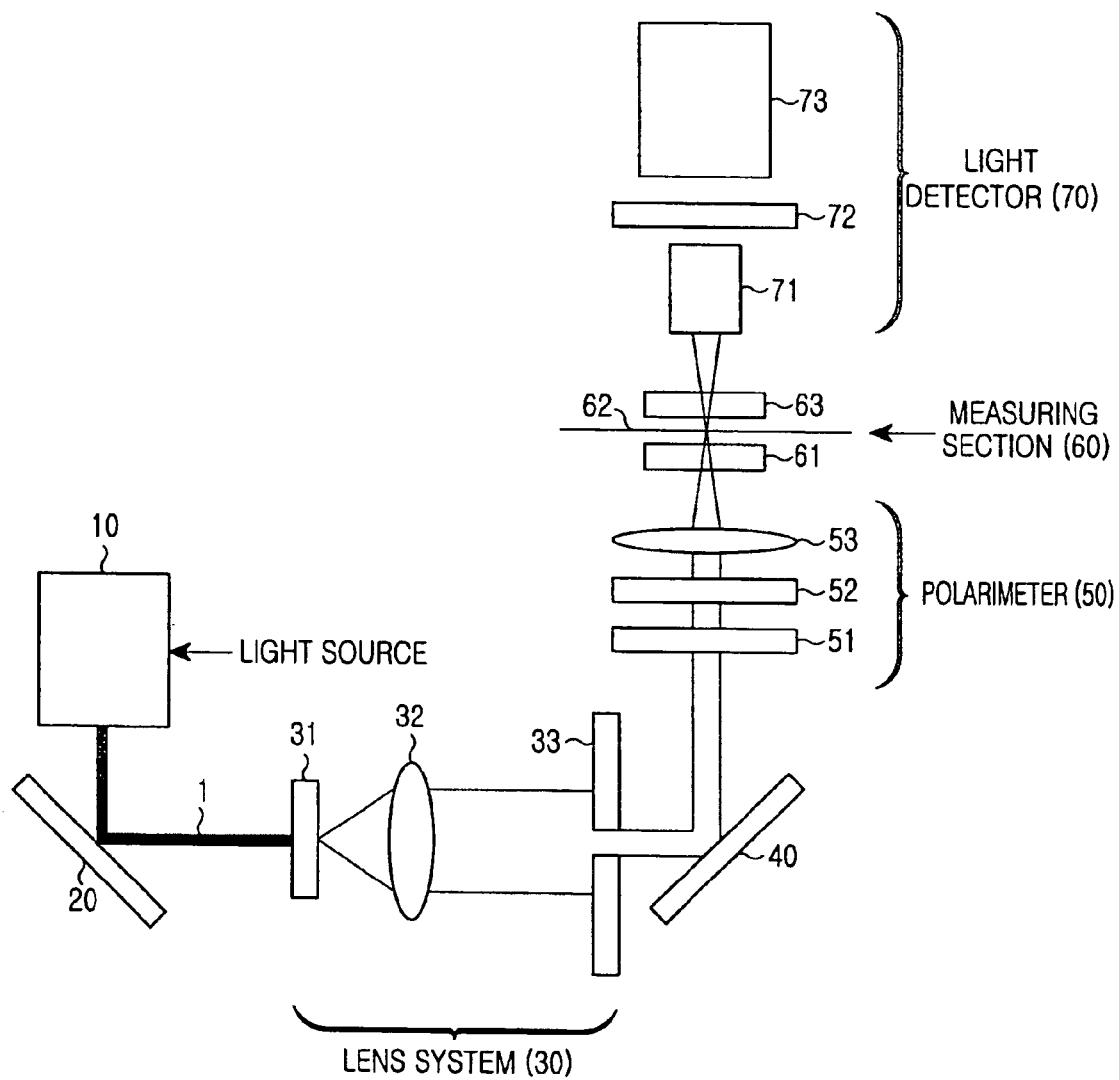
FIG. 1 is a schematic view of a residual stress measuring system for optical fibers according to the prior art.
Figure 2:
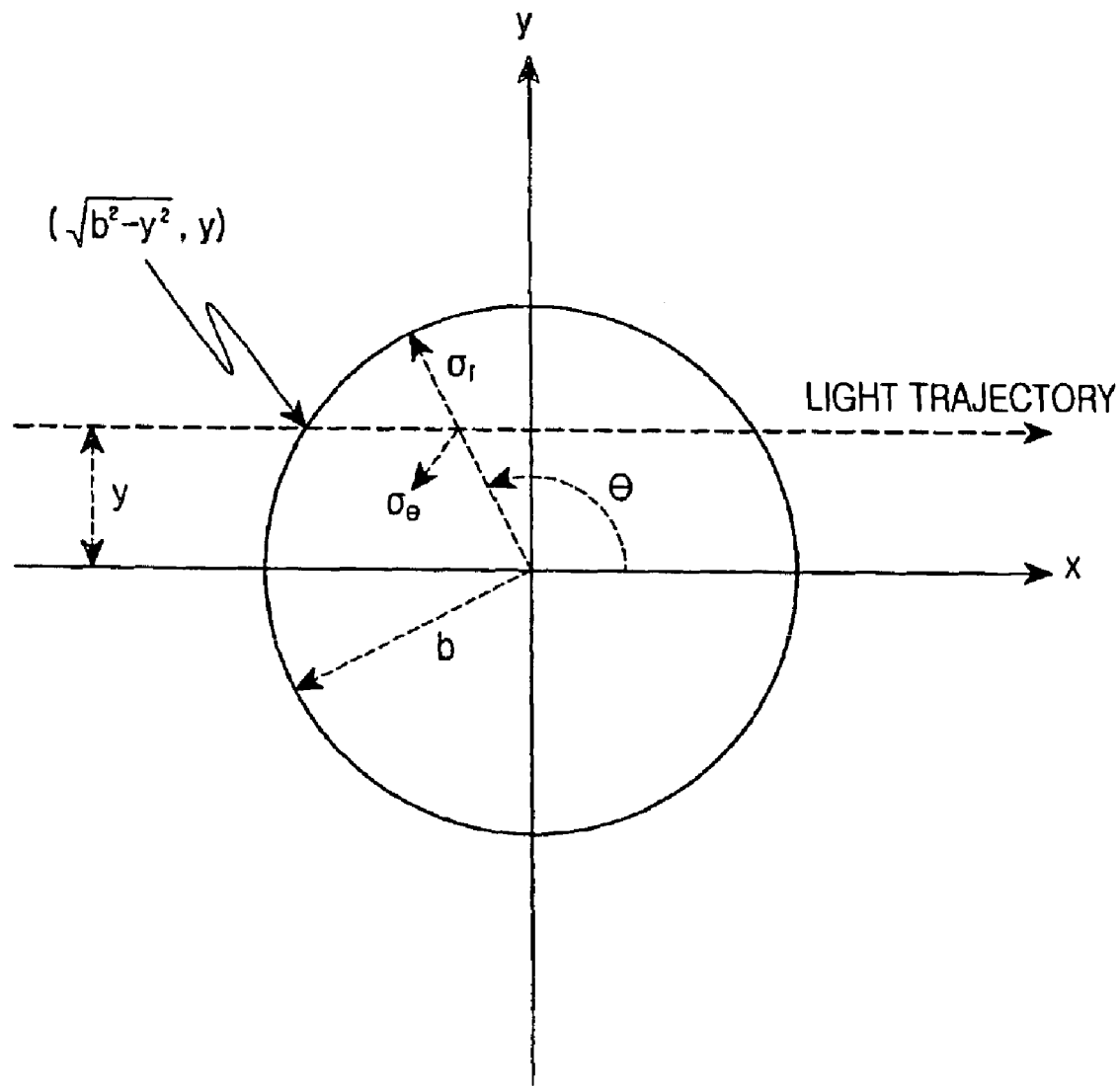
FIG. 2 shows a phase shift following a path of light.
Figure 3:
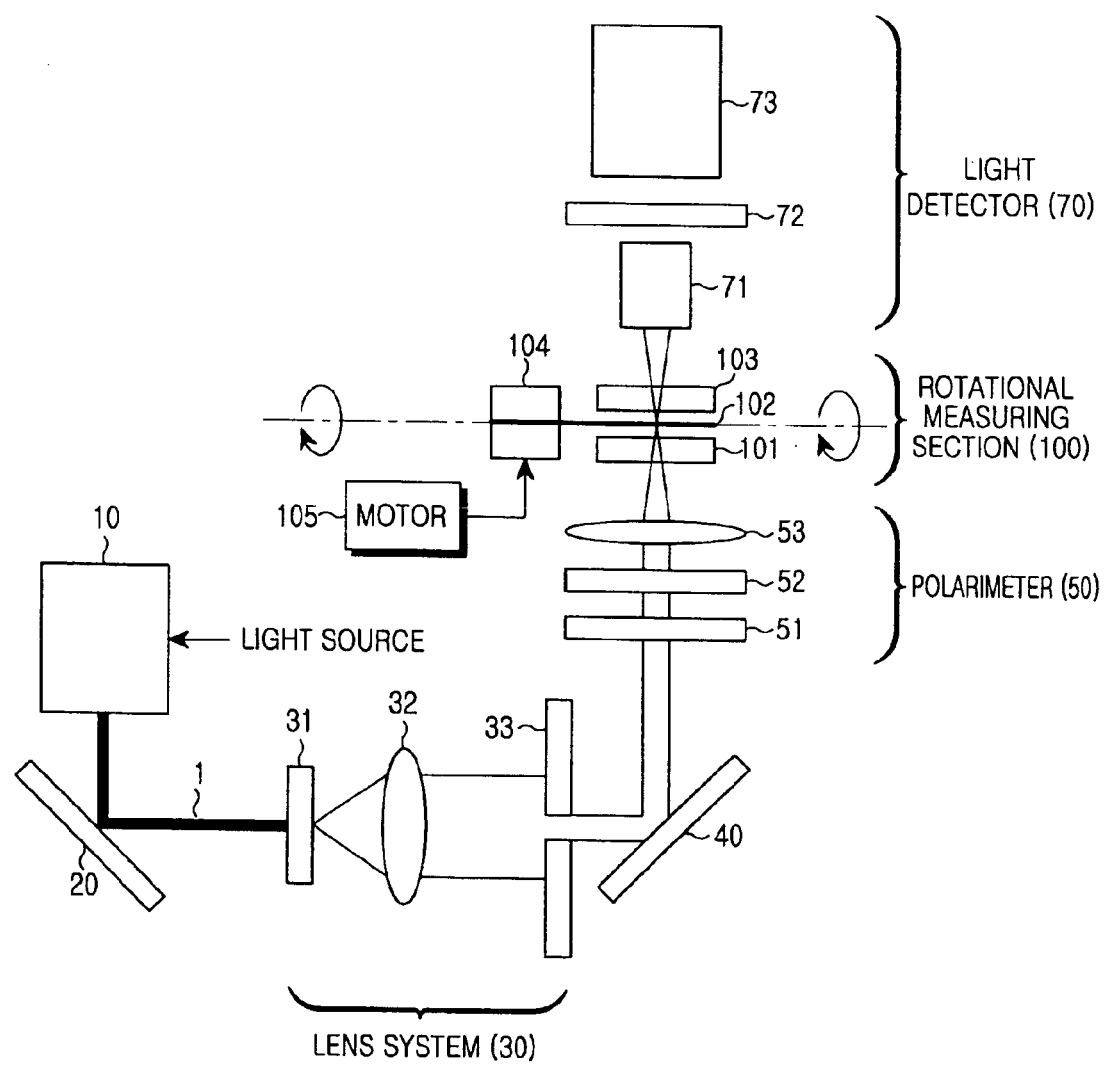
FIG. 3 is a schematic view of a residual stress measuring system for optical fibers according to the present invention.

FIG. 3 is a schematic view of a residual stress measuring system for optical fibers according to one embodiment of the present invention.

As shown in FIG. 3, a residual stress measuring system for optical fibers according to one embodiment of the present invention includes a light source 10, a lens system 30 for aligning the light generated from the light source 10, a polarimeter 50 for polarizing the aligned light output, a rotational measuring section 100 for measuring the residual stress in an optical fiber while rotating the optical fiber, and a light detector 70 for transforming a phase shift induced by the residual stress into an electrical signal.

In the embodiment, the rotational measuring section 100 is configured to measure the residual stress within an optical fiber having an asymmetrical circular stress distribution while rotating the optical fiber. Therefore, the following description will be focused on the rotational measuring section 100.

Figure 4:
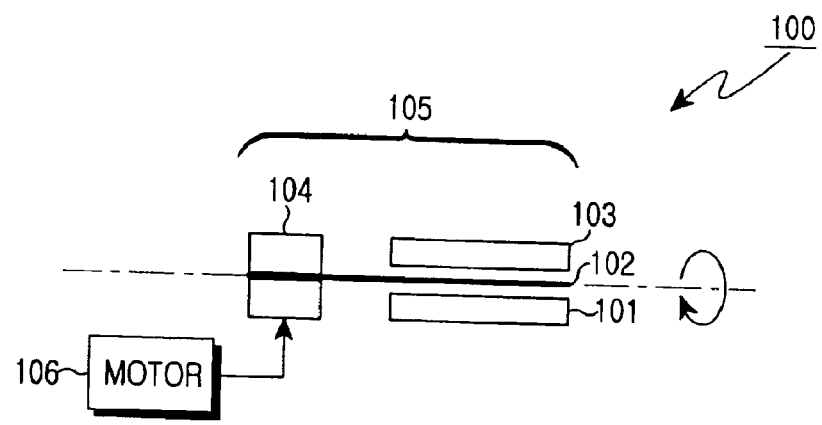
FIG. 4 shows a rotational measuring section of a residual stress measuring system for optical fibers according to a first embodiment of the present invention.

FIG. 4 is a schematic view illustrating a rotational measuring section of the inventive residual stress measuring system for optical fibers according to a first embodiment of the present invention. As shown, the rotational measuring section includes an optical fiber holding section 105 and a motor 106. In particular, the optical fiber hold section 105 includes a slide glass 101 and a cover glass 103 between which an optical fiber 102 is interposed, and a jig 104 for holding one end of the optical fiber. An oil matching the refractive index of the fiber is applied between the slide glass 101 and the cover glass 103. This is to prevent a certain stress from being applied from the exterior as well as to prevent an incident beam from being diffracted during the residual stress measurement of the optical fiber. The motor 106 functions to rotate the jig 104, which holds the optical fiber as well as the optical fiber to be measured.

Figure 5:
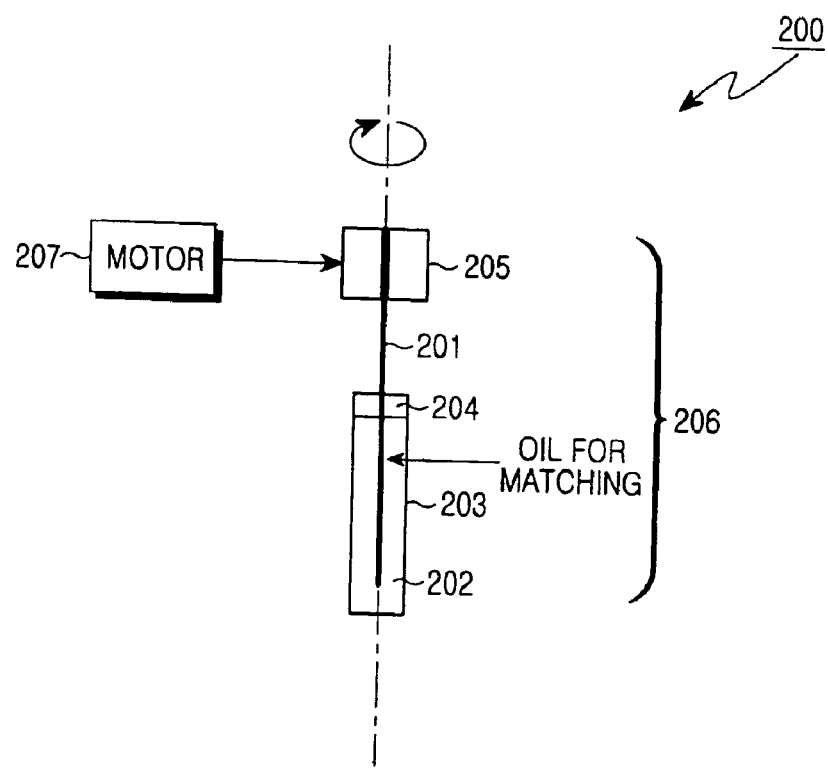
FIG. 5 shows a rotational measuring section of a residual stress measuring system for optical fibers according to a second embodiment of the present invention; and, FIG. 6 shows a rotational measuring section of a residual stress measuring system for optical fibers according to a third embodiment of the present invention.

FIG. 5 is a schematic view of the rotational measuring section according to a second embodiment of the present invention. As shown, the rotational measuring section includes an optical fiber holding section 206 and a motor 207. The rotational measuring section of the second embodiment is different from the first embodiment in that it performs the measurement of the optical fiber while rotating the optical fiber in a vertical position. For this purpose, the optical fiber to be measured is dipped into a cell, which is filled with oil 202 to match the refractive index of the fiber. The cell includes a tube 203 consisting of a quartz and a cap 204. The optical fiber 201 is held by the cap 204 and positioned in the tube 203. Also, the optical fiber clamping section 206 includes a jig 205 capable of holding one end of the optical fiber. The motor 207 rotates the jig 205 holding the optical fiber 201. Note that the cell 203 is fixed regardless of the rotation of the optical fiber.

Figure 6:
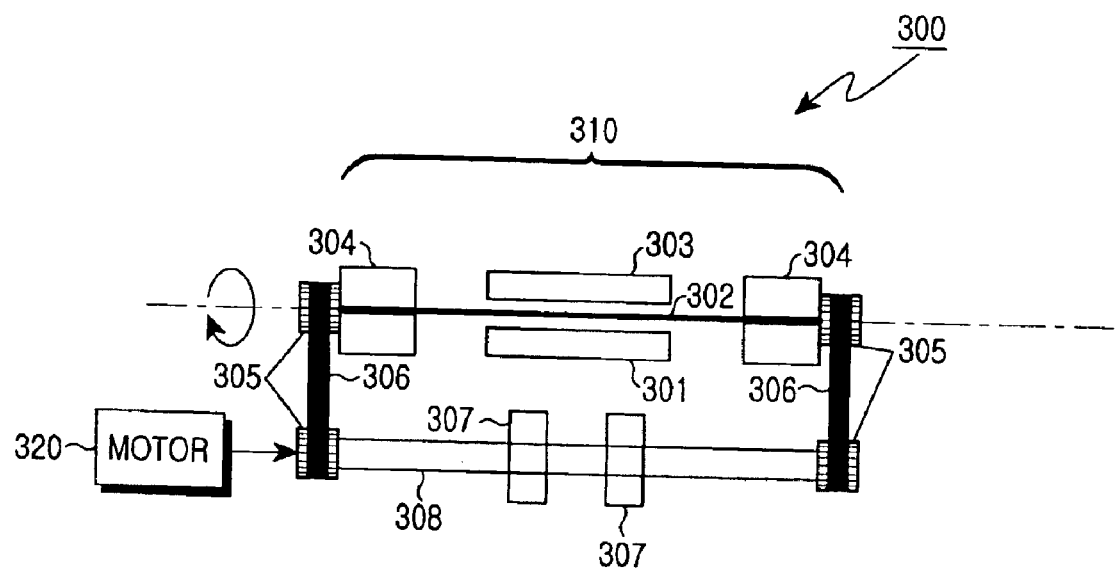

FIG. 6 is a schematic view of the rotational measuring section of a residual stress measuring system for optical fibers according to a third embodiment of the present invention. As shown, the rotational measuring section includes an optical fiber holding section 310 and a motor 320. Unlike the first embodiment where the residual stress of the optical fiber is measured while holding one end of the optical fiber for rotation, the third embodiment is designed to hold both ends of the optical fiber for rotation, so as to prevent an eccentricity or a focusing error that may occur. Further, this arrangement helps to control the rotation of the optical fiber.

As shown in FIG. 6, the optical fiber holding section 310 includes a slide glass 301 and a cover glass 303 between which the optical fiber is interposed, and a pair of jigs 304 for holding both ends of the optical fiber. The motor 320 further includes a driving section for transmitting the driving force of the motor to both jigs 304 at an equal rotating velocity. In this regards, the driving section comprises a pair of pulleys 305 and belts 306 for rotating both jigs simultaneously, at least one bearing 307, and a rotation shaft 308. In addition, an oil for matching the refractive index of the fiber is applied between the slide glass 301 and the cover glass 303. In respective embodiments, the oil for matching a refractive index must be viscous enough to rotate the optical fiber without any stress applied to the optical fiber.

As seen from the above description, the residual stress measuring system for optical fibers according to the preferred embodiments of the present invention is capable of measuring both the residual stress having an asymmetrical circular stress distribution within the optical fiber as well as the residual stress distribution as the residual stress within the optical fiber is measured during the rotation of the optical fiber.

While the invention has been shown and described with reference to certain preferred embodiments thereof, it will be understood by one skilled in the art that various modifications may be made therein without departing from the spirit and scope of the invention as defined by the appended claims.

What is claimed is:

1. A residual stress measuring system for measuring residual stress in an optical fiber, comprising:

a light source for generating light; a lens system for converting the generated light into a plane wave;

a polarimeter for transforming the converted light to an input polarized light;

a rotational measuring section for rotating the optical fiber to enable the polarized light to transmit through the optical fiber in various directions; and, a detector for detecting the residual stress having an asymmetrical circular stress distribution based on a phase shift of the light transmitted through the optical fiber.

2. The system according to claim 1, further comprising at least one mirror for changing a path of the light generated from the light source.

3. The system according to claim 1, wherein the rotational measuring section comprises:

an optical fiber holding section including a slide glass and a cover glass for interposing the optical fiber therebetween;

a first jig for holding one end of the optical fiber; and, a motor for rotating the first jig holding the optical fiber.

4. The system according to claim 3, wherein the optical fiber holding section further comprises:

a second jig for holding the other end of the optical fiber; and, a driving section for transmitting a rotating force from the motor to the first and second jigs uniformly for rotation of the optical fiber.

5. The system according to claim 3, wherein an oil having a substantially similar refractive index of the optical fiber is applied between the slide glass and the cover glass.

6. The system according to claim 3, wherein the optical fiber holding section comprises:

a jig for holding one upper end of the optical fiber so as to rotate the optical fiber in a vertical orientation; and, a cell, filled with an oil having a substantially similar reflective index of the fiber, for causing the optical fiber to be positioned therein in a vertical orientation.

7. The system according to claim 6, wherein the oil has a enough viscosity to rotate the optical fiber without any stress applied to the optical fiber.

* * * * *